March 20, 1951 I. G. MALOFF 2,545,524

SCHMIDT TELEVISION PROJECTION SYSTEM

Filed Aug. 29, 1945

INVENTOR

IOURY G. MALOFF

BY

H. B. Grover

ATTORNEY

Patented Mar. 20, 1951

2,545,524

UNITED STATES PATENT OFFICE 2,545,524

SCHMIDT TELEVISION PROJECTION SYSTEM

Ioury G. Maloff, Camden, N. J., assignor to Radio Corporation of America, a corporation of Delaware Application August 29, 1945, Serial No. 613,330

3 Claims. (Cl. 177—319)

The present invention relates to a system for projecting images produced by the cathode ray tube of electrical apparatus such, for example, as a television receiver and more particularly, though not necessarily exclusively, to means for maintaining an electro-optical image producing device having an active target area in correct position with respect to the reflective optical element of an image projection system.

In my copending application Serial No. 613,331, filed August 29, 1945, there is described and claimed a mounting combination for positioning the optical elements of a television image projector comprising, in part, a spherical mirror and an aspheric zone plate. A projection system comprising these parts is disclosed and claimed in United States Patent No. 2,373,801, granted February 17, 1942, to D. O. Landis. Reference may, therefore, be had to this Landis patent for a disclosure of general optical considerations applicable in producing a projector of the type to which reference is made in the following disclosure. The showing herein which is given by way of example of the mounting combination disclosed in detail and claimed in my copending application Serial No. 613,331, referred to above, is sufficient only for a complete understanding of the present invention. This present invention is directed to an improved tube holder in the combination of the previously mentioned copending application.

The primary object of the present invention is to provide a novel means for maintaining the curved target area of a cathode ray tube in correct relationship with respect to the spherical reflecting surface of a mirror.

Another object is to provide a means whereby the cathode ray tube in an image projector may be secured in its optically correct position with respect to the optical parts of the television projection system by the mere act of bringing it into this desired and correct position.

A further object of the present invention is to provide a high voltage connection of novel form for an electrode of a cathode ray tube.

A still further object of the invention is to provide a mounting of a cathode ray tube including a high voltage connector for its second anode.

A still further object is to provide a novel corona shield in combination with an electrical connector for an element of the cathode ray tube.

A still further object is to provide a novel mounting for a cathode ray tube which will not interfere with the focusing adjustment in an image projection system.

Figure 1:
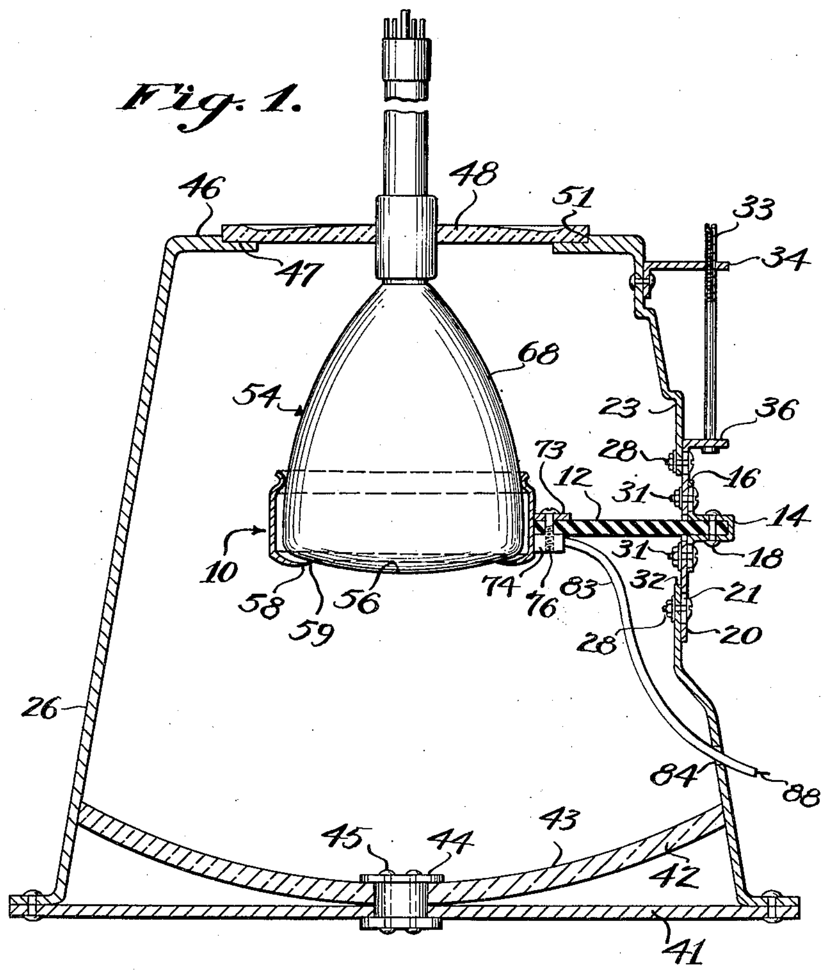
Figures 2, 3:
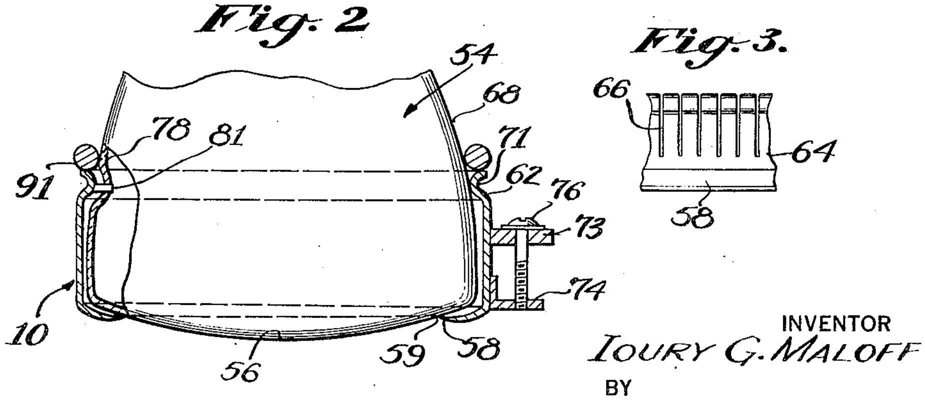

Other objects and advantages of the invention will, of course, become apparent and immediately suggest themselves to those skilled in the art to which the invention is directed from a reading of the following specification in connection with the accompanying drawings in which:

Fig. 1 is a view in sectional elevation of an image projection system including the tube holder of the invention;

Fig. 2, drawn to an enlarged scale, illustrates further details of the tube holder and connector of this invention; and Fig. 3 is a fragmentary elevational view of the tube holder of Fig. 2 showing details of its formation and structure.

The tube holder of the invention is indicated in its entirety by reference character 10 on Figs. 1 and 2. The adjustable support for this tube holder 10 is preferably arranged in accordance with the disclosure of application Serial No. 613,331, referred to above, so as to be movable for adjustment in three mutually perpendicular directions. The mounting for the support comprises an arm 12 of suitable high tension insulating material, such, for example, as "Mycalex," which is slidably mounted in a hollow member 14 having a flange 16. Suitable clamping means, such as a bolt or bolts 18, serve to hold the arm 12 in its adjusted position within the member 14. A plate 20 having elongated slots 21 is slidably mounted on a flattened portion 23 of a housing or barrel 26 by suitable fastening means such as bolts 28 threaded into the wall of the barrel 26 and slidably engaged with the slots 21. The flange 16 of the member 14 is slotted so that it may be moved laterally with respect to the axis of the barrel 26 on suitable fastening means such as the bolts 31. An opening 32 in the flattened portion 23 of the barrel 26 accommodates projections such as the bolts 31 on the plate 20 and thereby permits it to have free movement. A focusing screw 33 threadedly engaged in an aperture in a bracket 34 is rotatably connected to a flange 36 on the plate 20 thereby serving to focus the projector by moving the tube holder 10 axially in the barrel 26.

The barrel 26 is provided with an end closure member 41 upon which a mirror 42, having a spherical reflecting surface 43, is suitably mounted as by a fastening bracket 44 and bolts or equivalent fastening means 45.

The end 46 of the barrel 26, opposite the closure 41, is recessed to provide a seat 47 for a spherical zone plate or correcting lens 48. The shoulder 51 of the recess centers the correcting lens with respect to the optical axis of the projector.

It will be understood from the foregoing description of the general arrangement of the projection system that when a cathode ray tube 54 having a target area 56 is placed in the tube holder 10, the luminous image formed on this target area will be reflected toward the spherical reflecting surface 43 of the mirror 42. The target area 56 of the tube 54 is the object field of the projection system and when the image field, that is to say, the viewing screen (not shown) is flat, then the tube face must be curved.

The tube face may be made spherical with a radius of curvature substantially equal to that of the focal length of the system.

In accordance with the disclosure of my copending application Serial No. 613,331, previously referred to, the tube holder 10 has a circular beveled opening 58, as best shown by Fig. 2, providing a ring 59 upon which the curved tube face rests. When the position of the tube holder 10 is correctly adjusted by the means previously discussed, then with the tube face 56 seated on the ring 59, the tube face is in correct optical relationship with the principal optical elements of the system.

The tube holder 10, in accordance with the invention, is provided with a series of relatively closely spaced spring fingers 62. The fingers may readily be formed by initially making the tube holder generally cup-shaped so as to have cylindrical portion 64 of a desired depth, fragmentarily shown in Fig. 3, which may be cut or notched at spaced intervals as indicated at 66 to form a series of flexible fingers 62. The bulb portion 68 of the tube 54 is flared and is, therefore, narrower near the free ends of the fingers 62 than than it is in its end near the target surface 56. This effective tapering of the bulb portion 68 of the tube insures that the spring fingers will press the tube firmly against the ring 59. The free ends of the fingers are preferably curved inwardly as indicated at 71 on Fig. 2 of the drawing so that the spring fingers will contact the bulb adjacent their free ends.

It is to be noted that the fingers 62 securely maintain the tube 54 in position without introducing stresses in the arm 12 and its mounting which would affect the focusing adjustment by distorting the arm. An arm of relatively light cross-section may therefore be employed.

A bracket 73 and a cable terminal connector 74 are spaced apart to receive the free end of the arm 12 which is clamped between these members by suitable fastening means such as a bolt or bolts 76. Either or both of the members 73 and 74 may be soldered, brazed, or welded to the cylindrical portion 64 of the holder 10.

In accordance with the invention, an electrical connection is automatically made to the second anode 78 of the tube 54 when the tube is installed in the tube holder 10. The second anode, which is usually in the form of a coating on the interior of the bulb 68, is electrically connected to an electrical terminal member 81 exposed on the outside of the bulb. When the tube 54 is placed in position in the holder 10, one or more of the fingers at the location of the terminal member 81 will make electrical contact with this terminal. A cable 83 having insulation for high voltages passes through an aperture 84 in the wall of the barrel 26 and is fastened to the cable connector 74 as shown in Fig. 3 in such a manner that its conductor 88 makes electrical contact with the connector 74 and, in turn, with the tube holder 10. The conductor 88, it will be understood, is placed in communication with a suitable high voltage source (not shown) which is associated with electrical apparatus served by the tube 54.

The fingers 62 form a corona shield around the end of the tube by distributing the electrostatic field and thereby preventing undesirable corona discharge. For use when an exceptionally high voltage is to be applied to the second anode 78 of the tube, a ring 91 is in contact with one or more of the fingers 62 at or closely adjacent their ends to offset the effects of the numerous points which the fingers themselves represent. At these exceptionally high voltages, corona discharge occurs from the ends of the fingers 62, an effect which is not noticeable, or at least not troublesome in the more usual range of second anode voltages. The outside diameter of the ring must exceed the outside diameter of the circle formed by the free ends of the fingers.

Having now described the invention, what is claimed and desired to be secured by Letters Patent is the following:

1. In a projector for projecting luminous images produced by a cathode ray tube, a spherical mirror, a spherical aberration correcting lens, said mirror and said lens being spaced from each other whereby light from said mirror is directed through said correcting lens toward an image viewing screen, a support, means whereby the position of said support with respect to the axis of symmetry of said mirror and said correcting lens may be established, a holder for a cathode ray tube carried by said support, said holder having means defining at least three points on the curved target face of a cathode ray tube, and resilient means on said holder constructed and arranged to press the target face of the tube into contact with the point defining means and to maintain the tube bodily in position on said tube holder.

2. In a projector for projecting luminous images produced by a cathode ray tube, a spherical mirror, a spherical aberration correcting lens, said mirror and said lens being spaced from each other whereby light from said mirror is directed through said correcting lens toward an image viewing screen, a support, means whereby the position of said support with respect to the axis of symmetry of said mirror and said correcting lens may be established, a holder for a cathode ray tube carried by said support, said holder having means defining at least three points on the curved target face of a cathode ray tube, and a plurality of resilient fingers on said holder constructed and arranged to maintain the target face of the tube in contact with the point defining means and to maintain the tube bodily in position on said tube holder.

3. In a projector for projecting luminous images produced by a cathode ray tube, a spherical mirror, a spherical aberration correcting lens, said mirror and said lens being spaced from each other whereby light from said mirror is directed through said correcting lens toward an image viewing screen, a support, means whereby the position of said support with respect to the axis of symmetry of said mirror and said correcting lens may be established, a holder for a cathode ray tube carried by said support, said holder having means defining at least three points on the curved target face of a cathode ray tube, resilient means on said holder constructed and arranged to press the target face of the tube into contact with the point defining means and to maintain the tube bodily in position on said tube holder, said tube holder and said resilient means being electrically conductive, and an electrical connection to said tube holder, said resilient means serving as an electrical connector for said tube.

IOURY G. MALOFF.

REFERENCES CITED

The following references are of record in the file of this patent:

UNITED STATES PATENTS

| Number | Name | Date |
|---|---|---|
| 1,080,882 | Beck | Dec. 9, 1913 |
| 2,165,779 | Blaim | July 11, 1939 |
| 2,219,113 | Ploke | Oct. 22, 1940 |
| 2,273,801 | Landis | Feb. 17, 1942 |
| 2,295,802 | Nicholl | Sept. 15, 1942 |
| 2,298,808 | Ramberg | Oct. 13, 1942 |
| 2,497,660 | Devine | Feb. 14, 1950 |

FOREIGN PATENTS

| Number | Country | Date |
|---|---|---|
| 309,334 | Italy | July 3, 1933 |
| 378,681 | Great Britain | Aug. 18, 1932 |
| 459,355 | Great Britain | Jan. 6, 1937 |
| 461,450 | Great Britain | Feb. 17, 1937 |
| 506,418 | Great Britain | Aug. 25, 1937 |
| 520,412 | Great Britain | Apr. 23, 1940 |
| 527,892 | Great Britain | Oct. 17, 1940 |

OTHER REFERENCES

Magnetism and Electricity, Brooks and Poyser, Longmans, Green and Co., Ltd., 1927, pages 21 and 22.